Patented June 27, 1933

1,915,326

UNITED STATES PATENT OFFICE

THEODORE L. MASTERSON, OF BUFFALO, NEW YORK, ASSIGNOR TO NATIONAL ANILINE AND CHEMICAL COMPANY, INC., OF NEW YORK, N. Y., A CORPORATION OF NEW YORK

PROCESS OF PREPARING CONCENTRATED PRESS CAKES

No Drawing.  Application filed June 21, 1930. Serial No. 462,942.

This invention relates to the production of a press-cake or of a paste containing a solid, water-insoluble organic compound, particularly one containing a solid, water-insoluble organic coloring matter or a solid organic intermediate used in the manufacture thereof. It relates more particularly to a process of producing a concentrated paste or a concentrated press-cake comprising insoluble organic material from a paste or a press-cake of lower concentration, and is chiefly concerned with the production of a concentrated vat-dye paste from one of lower concentration, more particularly a paste containing an indigoid coloring matter, and especially one which contains indigo, as a constituent thereof.

In the production of indigo (indigotin) by subjecting an alkaline solution of leuco-indigo compound, or of indoxyl or an indoxyl derivative, to oxidation with atmospheric air, or with any other suitable oxidizing agent, the indigo is obtained as a precipitate in the form of a slurry, and upon filtration of the slurry by the usual method of filtration a filter-cake (press-cake) is obtained which normally contains not more than about 25 to 30 per cent. of indigo. A filter cake of this strength can be really utilized in any suitable manner in the preparation of a 20 per cent. indigo paste which is the strength of indigo paste normally prepared for commercial use.

A press-cake having a higher indigo content than about 25 to 30 per cent. cannot be readily obtained by the usual method of filtering an ordinary indigo slurry. Consequently, the commercial preparation of an indigo paste of high concentration, for example, an indigo paste containing from 40 to 60 per cent., or more, of indigo, requires the use of other methods than the mere adjustment of the ordinary press-cake, and the preparation of such an indigo paste usually involves evaporation.

I have found that an indigo press-cake or an indigo paste, for example, one having the normal indigo content, can be cencentrated to give a press-cake or paste having a higher indigo content, by intimately mixing the former with a small amount of a dispersing or modifying agent, particularly an organic leflocculating, dispersing or modifying agent, having the property of wetting the indigo and/or of reducing the viscosity of the press-cake, preferably in the presence of free alkali or of an alkaline substance, e. g., caustic soda, aqueous ammonia, sodium carbonate, etc., and filtering the resulting mixture. In this manner, an indigo filter-cake or paste having, for example an initial indigo content of about 20 to 30 per cent. can be readily concentrated to produce a filter-cake having an indigo content of about 40 to 60 per cent., or more, and from the press-cake thus obtained an indigo paste having approximately the same per cent. of indigo content can be readily prepared in any well-known manner. The preparation of an indigo paste of high indigo content is mainly for the purpose of effecting a saving in packing and shipping charges.

The following example will further illustrate the invention, but it will be understood that the invention is not limited thereto. The parts are by weight.

*Example.*—In any suitable vessel, 3000 parts of a 30 per cent. indigo paste or filter-cake containing 15 parts of free sodium hydroxide and approximately 2085 parts of water are thoroughly mixed with 30 parts of Turkey-red oil. The mixture becomes fluid in character and remains so provided it is alkaline (brilliant yellow test paper) in reaction, and, if necessary, additional amounts of caustic soda are added to maintain this condition. The mixture is then filtered in the usual manner and washed well with water. The press-cake thus obtained contains from 40 to 60 per cent. of indigo, and may be used in the preparation of an indigo paste having approximately the same strength.

In the above example, other agents may be employed which are capable of lessening the viscosity of the paste or filter-cake, particularly in the presence of an alkaline medium, whereby a fluid condition of the paste is produced which permits the same to be filtered and a more concentrated filter-cake to be obtained. For example, in place of Turkey-red oil, there may be employed the soluble soaps of the saturated or unsaturated fatty acids or of the resin acids, or their sulfonated derivatives, the aromatic sulfonic and/or carboxylic acids, their salts and derivatives such as, for example, the alkali-metal salts of the alkyl or aralkyl naphthalene sulfonic acids or their formaldehyde derivatives, etc. The amount of dispersing, deflocculating or modifying reagent employed should be sufficient to reduce the viscosity of the filter-cake, after its removal from the filter, and cause it to assume a more fluid condition such that it can be filtered with production of a filter cake. The amount of modifying agent employed should not be sufficient to convert all of the press-cake or paste into such a highly dispersed solution that upon filtration it passes through the filtering medium without leaving a filter-cake. In general, the amount employed should be such that only a relatively small or minor portion, if any, of the modified filter-cake or paste passes through the filtering medium into the filtrate, otherwise the loss in yield becomes unduly large. Ordinarily, the amount of modifying agent preferably employed is about one-quarter to five per cent. of the weight of solid matter in the paste or the filter-cake which is being subjected to concentration. The amount of free alkaline substance present or employed, preferably caustic alkali, may vary from an amount which gives only a faint alkaline reaction to the mixture to an amount which gives a decided alkalinity, for example, from about one-tenth to 2 per cent. by weight of the dried filter-cake.

In a similar manner, the present invention is generally applicable to the concentration of filter-cakes or of pastes comprised of solid, water-insoluble organic compounds. For example, pastes or press-cakes comprised of carbazole, benzanthrone, etc., and the insoluble coloring matters prepared therefrom, and particularly of indigoid coloring matters, such as, for example, the halogen- and alkyl-indigotins, the thio-indigos, the indirubins, etc., may be concentrated in accordance with the process of the present invention. In the claims it will be understood that the term "an indigoid filter-cake" includes filter-cakes comprising the indigoid coloring matters, while the term "an indigo filter-cake" denotes only those filter-cakes which contain coloring matters of the indigotin type.

I claim:

1. In the production of a concentrated aqueous paste containing a water-insoluble solid organic compound included in the class of organic coloring matters and intermediate therefor from a lesser concentrated aqueous paste containing said organic compound, the process which comprises incorporating with the lesser concentrated paste an agent selected from the group of wetting and dispersing agents, and filtering the resulting mixture.

2. In the production of a concentrated aqueous paste containing a solid, organic coloring matter insoluble in water from a lesser concentrated aqueous paste containing said coloring matter, the process which comprises admixing with the lesser concentrated paste an agent selected from the group of organic wetting and dispersing agents, and filtering the admixture.

3. In the production of a concentrated aqueous vat-dye paste from a lesser concentrated aqueous paste containing said vat-dye, the process which comprises incorporating with the said lesser concentrated paste a small amount of an organic agent having the property of reducing the viscosity of said paste and selected from the group of organic wetting and dispersing agents, and filtering the mixture.

4. In the production of a concentrated aqueous indigoid paste from a lesser concentrated aqueous indigoid paste, the process which comprises admixing with the lesser concentrated indigoid paste a small amount of an organic agent having the property of reducing the viscosity of said indigoid paste and selected from the group of organic wetting and dispersing agents, and filtering the admixture.

5. In the production of a concentrated aqueous indigo paste from a lesser concentrated aqueous indigo paste, the process which comprises incorporating with the said lesser concentrated indigo paste a small amount of a water soluble organic agent having the property of decreasing the viscosity of said paste and selected from the group of organic wetting and dispersing agents, and filtering the mixture.

6. In the production of a concentrated aqueous paste containing a water-insoluble solid organic compound included in the class of organic coloring matters and intermediates therefor from an aqueous suspension thereof, the process which comprises incorporating with said suspension an agent having the property of reducing the viscosity of the mixture and selected from the group of organic wetting and dispersing agents, rendering the mixture alkaline, and mechanically separating water from the resulting mixture.

7. In the production of a concentrated aqueous paste containing a water-insoluble solid organic compound included in the class of organic coloring matters and intermediates therefor from an aqueous suspension thereof, the process which comprises incorporating with said suspension an agent having the property of reducing the viscosity of the mixture and selected from the group of wetting and dispersing agents, and mechanically separating water from the resulting mixture.

8. In the production of a concentrated aqueous paste containing a water-insoluble solid organic coloring matter from an aqueous suspension thereof, the process which comprises incorporating with said suspension an agent having the property of reducing the viscosity of the mixture and selected from the group of wetting and dispersing agents, and mechanically separating water from the resulting mixture.

9. A process of producing a concentrated vat dye filter-cake which comprises incorporating with an aqueous vat dye filter-cake an organic agent having the property of lessening the viscosity of said filter-cake and selected from the group of organic wetting and dispersing agents, maintaining the mixture in an alkaline state, and filtering the resulting mixture.

10. A process for the production of a concentrated indigoid filter-cake which comprises incorporating an organic dispersing agent in an aqueous indigoid filter-cake, maintaining the mixture in an alkaline state, and filtering the resulting mass.

11. A process for the production of a concentrated indigo filter-cake which comprises incorporating Turkey-red oil with an aqueous indigo filter-cake, maintaining the said mixture in an alkaline state, and filtering the resulting mass.

12. A process of producing a filter-cake containing about 40 to 60 per cent. of indigo which comprises incorporating with a filter-cake containing about 20 to 30 per cent. of indigo an amount of Turkey-red oil equal to about one-half to one per cent. by weight of the filter-cake, adding sufficient caustic soda to maintain the mixture in an alkaline condition, and subsequently filtering the mixture.

13. In the production of a concentrated aqueous paste containing a solid organic dyestuff intermediate compound insoluble in water from a lesser concentrated aqueous paste containing said intermediate compound, the process which comprises admixing with the lesser concentrated paste an organic agent having the property of reducing the viscosity of said paste and selected from the group of wetting and dispersing agents, and filtering the admixture.

14. A process for the production of a concentrated aqueous paste containing a solid water-insoluble organic compound selected from the class of organic coloring matters and intermediates therefor, which comprises incorporating a small amount of a wetting agent into an aqueous paste of the water-insoluble organic compound, and filtering the mixture.

15. A process for the production of a concentrated aqueous paste of a vat dyestuff which comprises incorporating a small amount of an organic wetting agent with an aqueous paste of a vat dyestuff, rendering the mixture alkaline, and filtering the resulting mixture.

16. A process for the production of a concentrated aqueous paste of an organic dyestuff intermediate compound which comprises incorporating a small amount of an organic wetting agent with an aqueous paste of an organic dyestuff intermediate compound, rendering the mixture alkaline, and filtering the resulting mixture.

17. A process for the production of a concentrated aqueous paste of an indigoid dyestuff which comprises incorporating a small amount of an organic wetting agent with an aqueous paste of an indigoid dyestuff, rendering the mixture alkaline, and filtering the resulting mixture.

In witness whereof I have hereunto set my hand.

THEODORE L. MASTERSON.